United States Patent [19]

Tokuoka et al.

[11] 4,348,430
[45] Sep. 7, 1982

[54] PROCESS FOR PRODUCING MAGNETIC PARTICLES FOR MAGNETIC RECORDING MEDIUM

[75] Inventors: Yasumichi Tokuoka; Takayoshi Kobuke, both of Tokyo, Japan

[73] Assignee: TDK Electronics Company, Ltd., Tokyo, Japan

[21] Appl. No.: 210,801

[22] Filed: Nov. 26, 1980

[30] Foreign Application Priority Data

Jan. 19, 1980 [JP] Japan .................................. 55-5015

[51] Int. Cl.$^3$ ............................................. B05D 7/00
[52] U.S. Cl. .................................. 427/215; 427/128; 427/377

[58] Field of Search ................ 427/127, 215, 128, 377

[56] References Cited

U.S. PATENT DOCUMENTS 4,096,292  6/1978  Fagherazzi et al. ................. 427/127

Primary Examiner—Bernard D. Pianalto
Attorney, Agent, or Firm—Oblon, Fisher, Spivak, McClelland & Maier

[57] ABSTRACT

A process for producing magnetic particles for a magnetic recording medium from an acicular goethite as a starting material comprises a step of growing a Si-component-containing goethite as an outer layer.

4 Claims, 4 Drawing Figures

PROCESS FOR PRODUCING MAGNETIC PARTICLES FOR MAGNETIC RECORDING MEDIUM

BACKGROUND OF THE INVENTION

1. Field of the Invention

The present invention relates to a process for producing iron type magnetic particles which are usually used for a magnetic recording medium.

2. Description of the Prior Arts

It is well known that the important characteristics of magnetic particles for magnetic recording include a coercive force of magnetic particles, a dispersibility of magnetic particles in a magnetic paint for coating and an orientation of magnetic particles in a magnetic recording tape. As it is well known, these characteristics are important factors which highly affect to the characteristics of the magnetic recording tape. The shape of the magnetic particle directly relates to these characteristics of the magnetic particles. For example, when the coercive force is given by the shape anisotropy as the conventional magnetic recording medium, the coercive force is increased depending upon the improvement of the acicular property of the particles. The dispersibility is improved by decreasing branched or curved particles whereby the steric hindrance is decreased to improve the orientation and accordingly, the recording characteristics of the magnetic recording tape are improved. Therefore, it is important to obtain a magnetic particle having excellent acicular property with smaller branched shape in the preparation of the magnetic particles for a magnetic recording medium. In the industrial process, hydrated ferric oxide which is mainly goethite α-FeOOH and easily forms an acicular particle is firstly produced as a starting material and is converted into a magnetic metallic iron particle by heating, dehydrating and reducing it or is converted into $Fe_3O_4$ particles by partially reducing it or is converted into $\gamma\text{-}Fe_2O_3$ particles by oxidizing the product. These process have been usually employed.

In this process, the acicular property of the resulting particles depends on the shape of the starting goethite and accordingly, the shape of the goethite particles should be controlled. But in the conventional type of the particles, the deformation and sintering of the particles are disadvantageously easy to occur by the dehydration and the migration of atoms in the reduction process. This causes the limitation of the orientation in the tape as described below.

On the other hand, it is found that the growth of crystals of the particles is remarkably inhibited by Si component. There are many proposals based on the phenomenon as disclosed in Japanese Examined Patent Publication No. 19541/1977; and Japanese Unexamined Patent Publication No. 95097/1977; No. 134858/1977; No. 4895/1978; No. 30758/1977; No. 77900/1976; No. 121799/1977; and No. 153198/1977. Various processes for incorporating Si component in the acicular non-magnetic particles as the starting material can be considered as proposed. In the fundamental consideration, these processes can be classified into a process for growing crystals in the presence of Si component in the step of the production of the goethite as the starting material (referring to as A process) and a process for adsorbing Si component as a post treatment, after producing a non-magnetic particles (referring to as B process).

The A process is superior to the B process in view of the uniform incorporation of the Si component, however, it has disadvantage that the growth of the goethite crystals is inhibited to be difficult to obtain the particles having the desired size if the Si content is increased. The B process has not any difficulty on the control of the particle size, however, it is difficult to adsorb uniformly the Si component and the bonding of the Si component to the surface of the particles is not so strong to effectively impart the effect of the Si component. On the contrary, the present invention is to combine both the advantages to overcome the disadvantages.

SUMMARY OF THE INVENTION

It is an object of the present invention to provide a process for producing acicular magnetic particles having excellent particle size distribution and acicular property without forming deformation of particles and sintering of particles.

The foregoing and other objects of the present invention have been attained by providing a process for producing magnetic particles for a magnetic recording medium from acicular goethite particles as the starting material which comprises a step of growing a Si-component-containing goethite as an outer layer.

DETAILED DESCRIPTION OF THE PREFERRED EMBODIMENTS

In accordance with the process of the present invention, acicular goethite particles having a desired acicular property are previously formed and are used as seed crystals, and the Si-component-containing goethite is grown as an outer layer in the two steps, whereby the acicular goethite particles having excellent size distribution as the process B in view of the particle size control and having uniform S-component incorporation as the process A in view of uniform incorporation of Si-component.

In usual, when acicular goethite particles are heat-treated by heating, dehydrating, and reducing the particles gradually change into skeleton form under growing many grains in the particles during the change from the goethite particles into magnetic particles. In the process of the present invention, the Si-component-containing goethite layer is formed as the outer layer of the seed crystals, whereby the growth of the grains in the skeleton form is remarkably controlled to reduce the deformation of the particles and the sintering of the particles and the acicular magnetic particles having excellent particle distribution and acicular property is obtained.

The present invention will be illustrated by certain examples and references which are provided for purposes of illustration only and are not intended to be limiting the present invention.

EXAMPLES 1 TO 4

(1) Step of producing goethite particles as seed crystals

Into 1 liter of aqueous solution containing 3 mol of $FeCl_3$ and 0.09 mol of $ZnCl_2$, 4.5 liter of an aqueous solution containing 12.2 mol of NaOH was added dropwise at a rate of 20 ml per minute. The resulting ferric hydroxide precipitate was aged by maintaining at room temperature for 24 hours. After 24 hours, the slurry with the mother liquor were charged into an autoclave and treated by a hydrothermal reaction at 150° C. for 1 hour under the elevated pressure. The resulting slurry containing goethite particles is referred to as Slurry I.

(2) Step of growing Si-component-containing goethite

Into Slurry I, 8.6 liter of an aqueous solution containing 340 g. of $KClO_3$ and 29 mol of NaOH was added and then, 2.8 liter of an aqueous solution containing 3 mol of $FeSO_4$ was added with thoroughly stirring and the stirring was continued. An aqueous solution of sodium silicate having a concentration of 20% as $SiO_2$ was added at a specific ratio to the mixture and the product with the mother liquor were charged into an autoclave and treated by a hydrothermal reaction at 130° C. for 1 hour. The condition for the treatment was varied in each process of Examples 1 to 4. The conditions are shown in Table 1. In Examples 1 to 4, each precipitate having double layer structure consisting of a goethite layer as the inner part and a Si-component-containing goethite layer as the outer layer. (Sample No. $E_1$ to $E_4$) was obtained. Each precipitate was washed with water and separated by a filtration and dried and pulverized.

Figure 1:
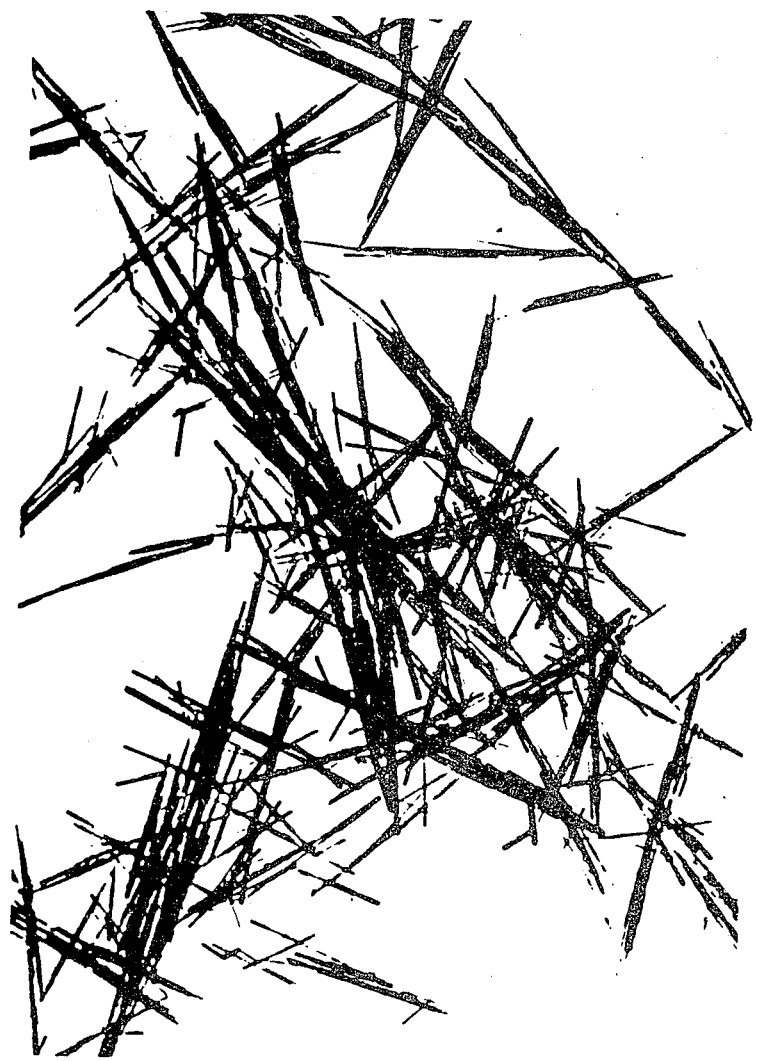
FIGS. 1 to 4 show electron microscopic photographs of magnetic particles obtained by the process of the present invention.
Figure 2:
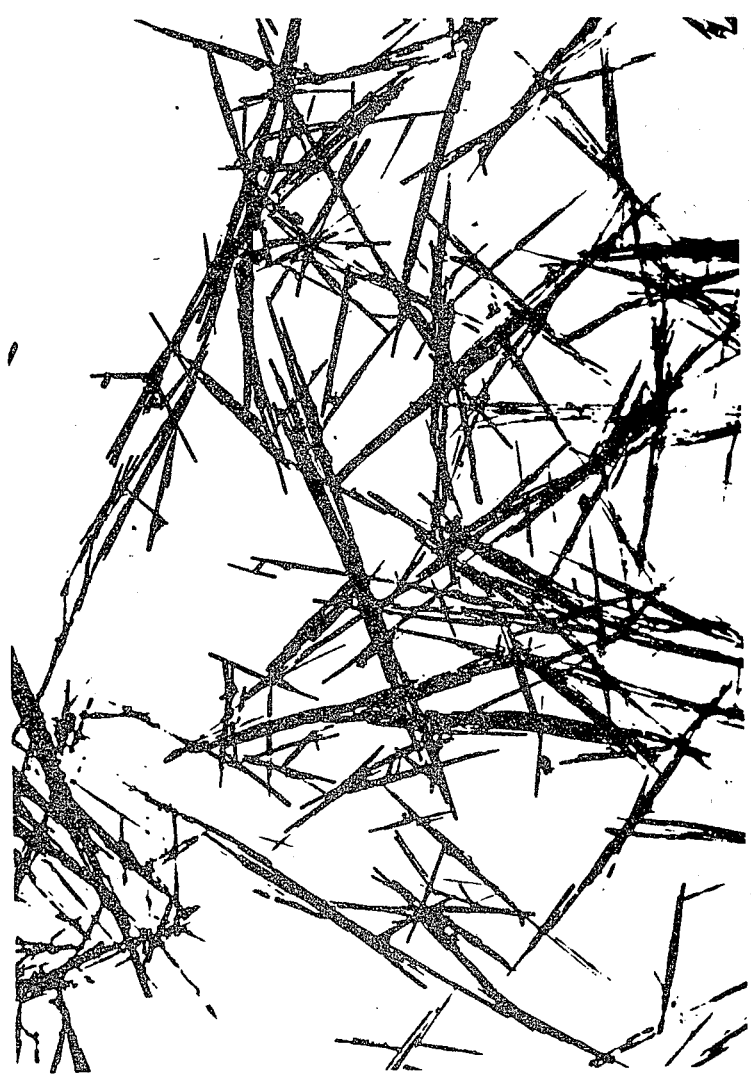
Figure 3:
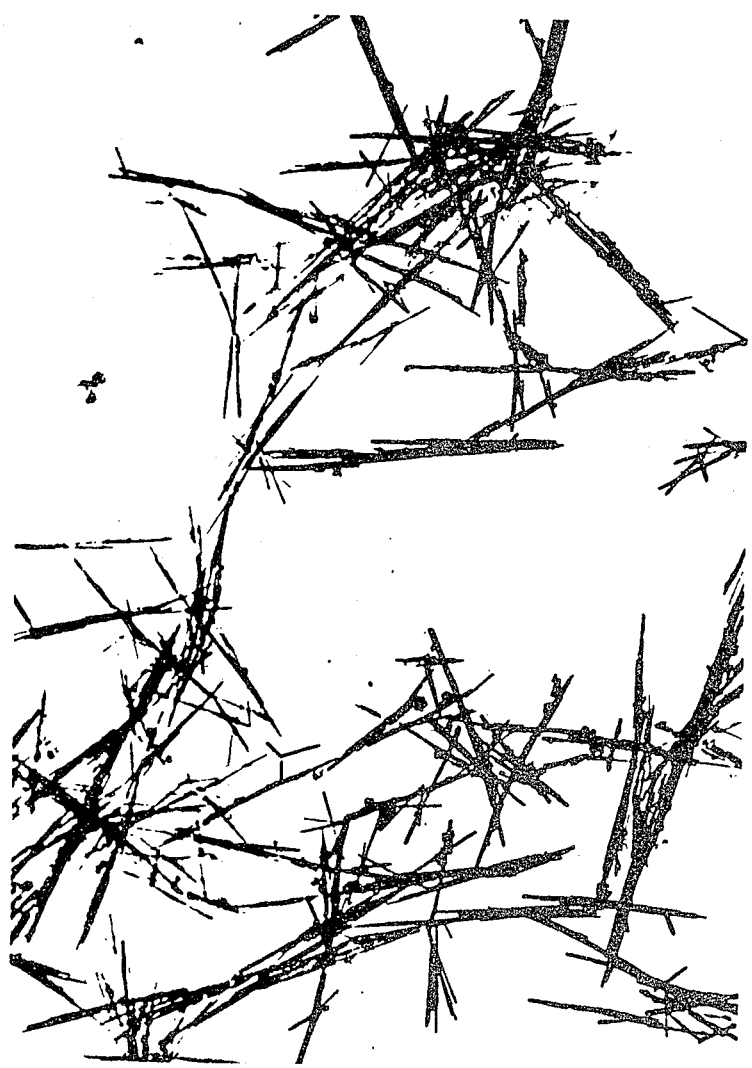
Figure 4:

FIGS. 1 to 4 show electron microscopic photographs of the particles obtained by these processes. As it is clear from FIGS. 3 and 4, when the Si-content is more than 3% (atomic ratio) based on goethite (Examples 3 and 4), the formation of goethite from the newly added iron ion is not completed to contain non-acicular amorphous iron hydroxide.

One gram of each of Samples $E_1$ and $E_2$ which contained less than 3% of Si/Fe was heat-treated in hydrogen gas flow at 400° C. for 40 minutes to obtain each of magnetic particles which are referred to as Samples $E_1$ and $E_2$.

TABLE 1

| Amount of 20% aqueous solution of sodium silicate | 9 | 18 | 27 | 36 |
|---|---|---|---|---|
| Atomic ratio of Si/Fe (newly added) (atm %) | 1.0 | 2.0 | 3.0 | 4.0 |
| Example | $E_1$ | $E_2$ | $E_3$ | $E_4$ |

EXAMPLE 5

(1) Step of producing goethite particles as seed crystals

In a reactor containing 10 liter of 1N-NaOH aqueous solution, 10 liter of an aqueous solution containing 3 mol of $FeSO_4$ was charged and air was bubbled at a rate of 5 liter per minute under heating it at 50° C. to perform the oxidation for 20 hours, whereby acicular goethite particles were produced. The resulting slurry was referred to as Slurry II.

(2) Step of growing Si-component-containing goethite

Into Slurry II, 1.2 liter of an aqueous solution containing 3.75 mol of $FeCl_3$ was added and 2 liter of an aqueous solution containing 450 g. of NaOH was added with stirring and then, the mixture was kept for 10 hours. After 10 hours, 9 g. of an aqueous solution of sodium silicate having a concentration of 20% as $SiO_2$, was added to the reaction mixture. The mixture with the mother liquor were charged in an autoclave and treated by a hydrothermal reaction at 110° C. for 1 hour to obtain a precipitate having double layer structure consisting of a goethite layer as the inner part and a Si-component-containing goethite layer as the outer layers (Sample $E_5$).

In accordance with the process of Example 1 or 2, the precipitate was washed with water and separated by a filtration and dried and pulverized and heat-treated in hydrogen gas flow to obtain a magnetic particles which are referred to as Sample $E_5$.

EXAMPLE 6

Into Slurry II obtained in Example 5, 3 liter of 1N-NaOH aqueous solution was added and 5 liter of an aqueous solution containing 2.25 mol of $FeSO_4$ was added and then, 5 g. of an aqueous solution of sodium silicate having a concentration of 20% as $SiO_2$ was added. Air was bubbled into the mixture heated at 50° C. to carry out an oxidation for 10 hours to obtain a precipitate having double layer structure consisting of a goethite layer as the inner part and a Si-component-containing goethite layer as the outer layer (Sample $E_6$).

In accordance with the process of Example 1, 2 or 5, the precipitate was washed with water and separated by a filtration and dried and pulverized and heat-treated in hydrogen gas flow to obtain a magnetic particles which are referred to as Sample $E_6$.

REFERENCE 1

In accordance with the process of Example 5, the goethite obtained in Slurry II in Example 5 was washed and separated by a filtration and dried and pulverized and heat-treated in hydrogen gas flow to obtain magnetic particles which are referred to as Sample $C_1$.

REFERENCE 2

In accordance with the process of Reference 1, the goethite obtained in Slurry I in Examples 1 to 4 was treated to obtain a magnetic particles which are referred to as Sample $C_2$.

REFERENCE 3

In accordance with the process of Examples 1 to 4 except that the aqueous solution of sodium silicate was not added, a magnetic particles were produced. The product is referred to as Sample $C_3$.

REFERENCE 4

In accordance with the process of Example 6 except that the aqueous solution of sodium silicate was not added, magnetic particles were produced. The product is referred to as Sample $C_4$.

Magnetic characteristics of the magnetic particles obtained in Examples 1, 2, 5 and 6 and References 1 to 4 (Samples $E_1$, $E_2$, $E_5$, $E_6$, $C_1$, $C_2$, $C_3$ and $C_4$) were measured and shown in Table 2.

TABLE 2

|  | Coercive force (Oe) | Saturated magnetization (emu/g) | $\sigma_r/\sigma_s$ |
|---|---|---|---|
| Exp. $E_1$ | 1590 | 116 | 0.63 |
| $E_2$ | 1591 | 113 | 0.63 |
| $E_5$ | 1600 | 115 | 0.62 |
| $E_6$ | 1550 | 119 | 0.61 |
| Ref. $C_1$ | 1025 | 121 | 0.51 |
| $C_2$ | 1282 | 120 | 0.54 |
| $C_3$ | 1183 | 133 | 0.59 |
| $C_4$ | 1210 | 131 | 0.58 |

As it is clear from Table 2, the magnetic particles of Samples $E_1$, $E_2$, $E_5$ and $E_6$ of the present invention had remarkably superior coercive force, acicular ratio and $\sigma r/\sigma s$ to those of the magnetic particles of Samples $C_1$, $C_2$, $C_3$ and $C_4$.

In usual, the particles gradually change into a skeleton form under growing many grains in the particles during the change from the goethite particles into magnetic particles. The shape of the particles is deformed depending upon the growth of grains whereby the coercive force and the acicular ratio are lowered and the saturated magnetization is increased as the magnetic characteristics to be disadvantageous for the magnetic particles for a magnetic recording medium.

On the other hand, in accordance with the present invention, when the Si-component-containing goethite layer is grown as the outer layer around the goethite core, the growth of the grains in the skeleton form is highly controlled because of the presence of the Si-component in the outer layer whereby the deformation of the particles is remarkably reduced. Therefore, the magnetic particles having high coercive force and high acicular ratio which is suitable for a magnetic recording medium can be obtained. According to the observation of the electron microscopic photographs, it has been found that the deformation of the particles in Examples of the present invention is remarkably small.

In the process of the examples of the present invention, as it is found by the measurements of the magnetic characteristics of the samples, the particles are reduced to be metallic iron. In usual, it is possible to select the product from the magnetic iron oxide to the magnetic metallic iron depending upon the condition in the conversion from the goethite particles to the magnetic particles by the heat-treatment. For example, the magnetic iron oxide particles can be obtained by an interruption of the reduction by the heat treatment at the step of the reaction prior to form the metallic particles.

When it is reduced into the metallic particles, it is necessary to eliminate oxygen atoms forming the main lattice of goethite as the starting material whereby the migration of atoms is severest. If the deformation of the particles caused by the heat-treatment can be minimized at this stage, it is further effective in the case of the production of the magnetic iron oxide obtained by the interruption of the reaction.

As it is clear from the electron microscopic photographs of the magnetic particles obtained in Examples 1 to 4 (FIGS. 1 to 4), the amount of Si-component added in the growth of goethite should be less than 3% (atm.%) based on Fe for newly growing. The goethite particles as the seed crystals can be produced not only by the process of Examples but also the other suitable processes.

As described above, in accordance with the process of the present invention for producing the magnetic particles for a magnetic recording medium from the acicular goethite, it is characterized by using the step of growing the Si-component-containing goethite around the seed crystals of goethite as the starting material, whereby the magnetic particles for a magnetic recording medium which has excellent particle size distribution and excellent acicular property can be obtained without causing the deformation of particles and the sintering of particles.

We claim:

1. A process for producing magnetic particles for a magnetic recording medium, comprising: (a) preparing particles of goethite seed crystals; (b) precipitating a layer of goethite on said seed crystals and simultaneously precipitating silicate ions on said crystals with the precipitating goethite material; and (c) heat treating the coated particles to obtain the desired particulate metallic magnetic product.

2. The process of claim 1, wherein the content of silicon in said outer layer is less than 3 atomic percent based on iron.

3. The process of claim 1, wherein silicon is incorporated in said outer layer by coating goethite particles with a mixture of sodium silicate in FeOOH.

4. The process of claim 1, wherein said particulate metallic magnetic product is obtained by heat treating said coated particles in the presence of a flow of hydrogen gas at an elevated temperature.

* * * * *